(12) United States Patent
Stine et al.

(10) Patent No.: US 7,334,984 B1
(45) Date of Patent: Feb. 26, 2008

(54) TURBINE SHROUD ASSEMBLY WITH ENHANCED BLADE CONTAINMENT CAPABILITIES

(75) Inventors: Frederick J. Stine, Coral Springs, FL (US); James W. Tucker, Cape Coral, FL (US); Stephen J. Szpunar, Weston, FL (US)

(73) Assignee: Heico Corporation, Hollywood, FL (US)

( * ) Notice: Subject to any disclaimer, the term of this patent is extended or adjusted under 35 U.S.C. 154(b) by 268 days.

(21) Appl. No.: 11/021,895

(22) Filed: Dec. 24, 2004

Related U.S. Application Data

(60) Provisional application No. 60/585,613, filed on Jul. 6, 2004, provisional application No. 60/541,801, filed on Feb. 4, 2004, provisional application No. 60/532,543, filed on Dec. 24, 2003.

(51) Int. Cl.
*F01D 11/08* (2006.01)
(52) U.S. Cl. .................. 415/173.1; 415/174.2
(58) Field of Classification Search ............. 415/173.1, 415/173.3, 173.4, 173.5, 173.6, 174.2
See application file for complete search history.

(56) References Cited

U.S. PATENT DOCUMENTS

| | | | | |
|---|---|---|---|---|
| 3,603,599 A | * | 9/1971 | Laird ....................... | 415/173.5 |
| 5,201,846 A | * | 4/1993 | Sweeney .................. | 415/173.6 |
| 6,120,242 A | | 9/2000 | Bennoitt et al. | |
| 6,468,026 B1 | | 10/2002 | Bennoitt et al. | |
| 6,962,482 B2 | * | 11/2005 | Tanaka ..................... | 415/173.1 |
| 6,966,752 B2 | * | 11/2005 | Gieg et al. ............... | 415/173.4 |

* cited by examiner

*Primary Examiner*—Igor Kershteyn
(74) *Attorney, Agent, or Firm*—Welsh & Katz, Ltd.

(57) ABSTRACT

A low pressure turbine shroud assembly includes a backsheet with enhanced blade containment capabilities that is sized to be retrofitted into a conventional low pressure turbine assembly. The backsheet has first and second mounting rails at axially opposite ends thereof and a blade containment sheet shield disposed therebetween. The rails and the containment shield are of a uniformly increased thickness as compared with a conventional backsheet rail and containment shield design. The assembly also includes a modified mounting hook for mounting the improved backsheet to a case extending around the shroud. The mounting hook is of reduced thickness as compared with a conventional mounting hook for a conventional backsheet proportional to the increase in thickness of the backsheet. The assembly also can include a rub strip disposed between a radially inner surface of the backsheet and a turbine blade.

20 Claims, 3 Drawing Sheets

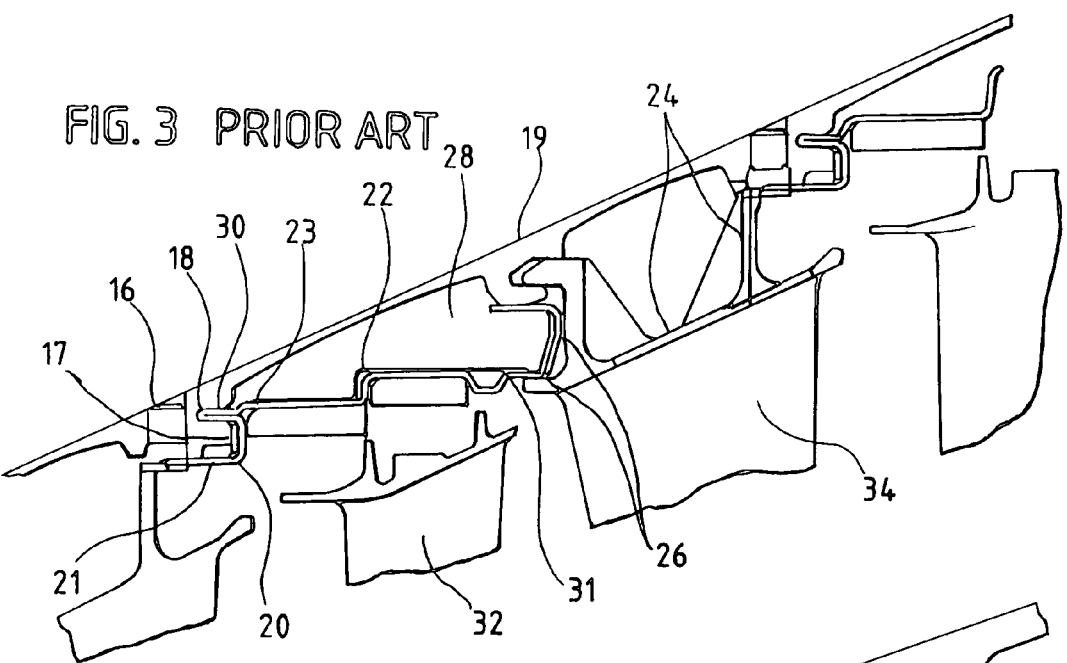
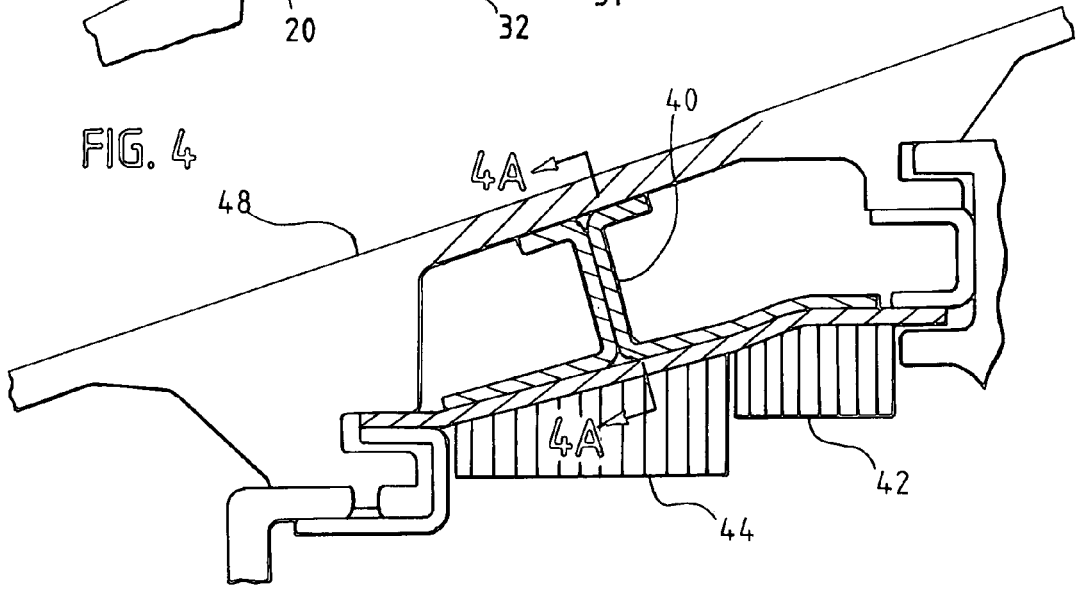
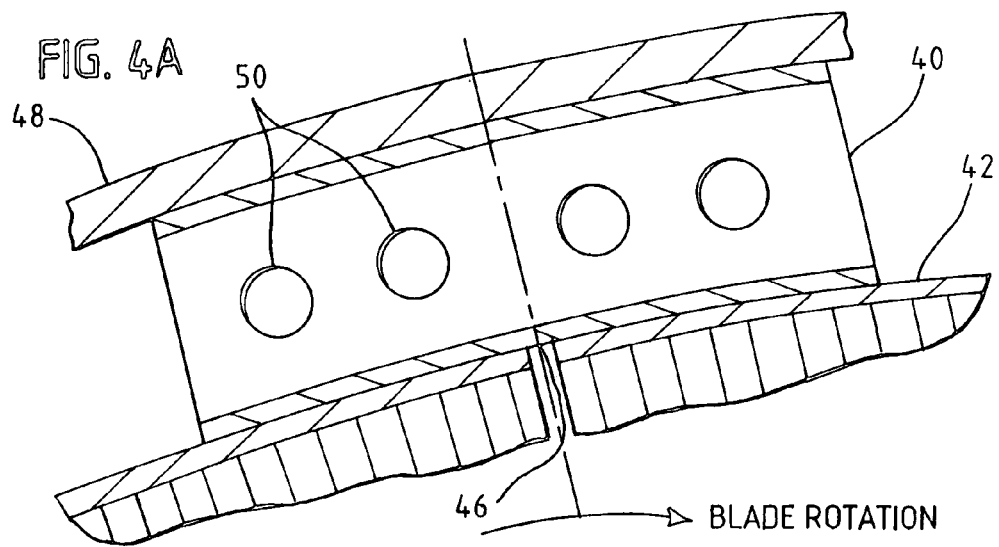

TURBINE SHROUD ASSEMBLY WITH ENHANCED BLADE CONTAINMENT CAPABILITIES

CROSS REFERENCE TO RELATED APPLICATIONS

This application claims the benefit of priority from and incorporates the disclosures of Provisional Application Ser. No. 60/532,543, entitled Alternate Blade Containing Turbine Shroud, and filed on Dec. 24, 2003; Provisional Application Ser. No. 60/541,801, entitled Laminated Containment System (LCS) For Blade Containing Turbine Shroud, and filed on Feb. 4, 2004 and Provisional Application Ser. No. 60/585,613, entitled Alternate Blade Containing Turbine Shroud, and filed on Jul. 6, 2004.

BACKGROUND OF THE INVENTION

This invention relates to jet engine low-pressure turbine assemblies, and more particularly to an improved system for containing ejected turbine blades and other failure events.

An area of recent concern in aircraft engine applications is the containment of low-pressure turbine ("LPT") blades. Over the past several years incidents have occurred where LPT blades have been liberated from the respective disks and have escaped uncontained from the engine, piercing through the airframe cowling. These ejection events have the potential for hazarding the aircraft.

Normally in LPTs, the shrouds mounted in the casing are relatively thin and are not relied on to provide blade containment. As disclosed in U.S. Pat. Nos. 6,120,242 (Bonnoitt et al.) ("'242 patent") and 6,468,026 (Bonnoitt et al.) ("'026 patent"), which are incorporated by reference, conventional LPT shroud backsheets were made of thin sheet metal of essentially uniform thickness and served little if any blade containment function. The forward and aft ends of the backsheet are referred to as "rails." The rails are mounted to corresponding mounting hooks on the casing. Typical conventional backsheet thicknesses range from about 0.015-0.025 inches. The shroud also includes a honeycomb rub strip fixedly joined or bonded directly to the radially inner surface of the backsheet.

In developing blade containment systems for segmented LPT shrouds, considerations include dissipating energy from the blade during an ejection event and reducing the chance of blade ejection or (1) elimination of potential crack growth in the backsheet and (2) improving shear strength of the backsheet at the mounting location. Potential ways to improve containment in existing designs where field experience has indicated that the case is not thick enough to provide adequate containment include increasing case thickness or using thicker shrouds to supplement containment capability of the casing.

Increasing the casing thickness is expensive, as entire casings must be replaced if a current engine is to be retrofitted with a casing of enhanced thickness. Thickening the shrouds raises several issues that must be addressed to ensure a workable design. To improve blade containment, some prior art designs brazed a piece of sheet metal onto the backsheet for reinforcement. This extra piece of sheet metal is commonly referred to as a "doubler." However, the '242 and '026 patents disclose drawbacks to the "doubler" design because the brazing interface is relatively brittle and subject to cracking, which decreases rather than improves the overall strength of the shroud in a containment event. To overcome these drawbacks of the "doubler" design, the '242 and '026 patents disclose increasing the thickness of the middle portion or "blade containment shield" of the backsheet, but leaving at least one of the backsheet ends, sometimes referred to as rails, at a conventional thickness to permit them to be retrofitted into existing LPT mounting hooks. However, the design contemplated in the '242 and '026 patents also has drawbacks. One such drawback with this design is that the interface between the thicker middle section and thinner rails is a potential weak link in the backsheet, where failure is likely to occur in the event of a turbine blade ejection event. Therefore, there is a need for a backsheet design having the blade containment benefits of a thicker blade containment shield, while avoiding the drawbacks of the thinner rails at the ends of the backsheet and still maintaining the possibility of retrofitting the improved backsheet into an existing LPT shroud.

BRIEF SUMMARY OF THE INVENTION

A low pressure turbine shroud assembly is disclosed having a backsheet with enhanced blade containment capabilities that is sized to be retrofitted into a conventional low pressure turbine assembly. The backsheet has first and second mounting rails at axially opposite ends thereof and a blade containment sheet shield disposed therebetween. The rails and containment shield are of uniformly increased cross-sectional thickness as compared with a conventional backsheet rail and containment shield design. The increased cross-sectional thickness is in excess of about 0.015-0.025 inches. The assembly also includes a modified mounting hook for mounting the backsheet to a turbine case extending around the shroud. The hook corresponds to and engages the backsheet at one of the rails. The hook is of reduced cross-sectional thickness as compared with a conventional mounting hook for mounting a conventional backsheet to a turbine case. The reduced cross-sectional thickness is proportional to the increase in thickness of the backsheet.

The assembly also includes a rub strip disposed between a radially inner surface of the backsheet and a turbine blade.

In an alternative embodiment, a low pressure turbine assembly is disclosed having first and second turbine shroud segments each having a radially inward and a radially outward surface. The first turbine shroud segment is adjacent the second segment. A containment bridge is affixed to the radially outward surface of the first shroud segment and extending over the radially outward surface of the second shroud segment; and a turbine case extends around the shrouds and the bridge, with the bridge disposed between the shrouds and the case. The bridge also can include one or more weight reducer holes.

In an alternative embodiment, a laminated containment system for low pressure turbine shrouds is disclosed having an arcuate turbine shroud having a primary containment sheet and a first and a second rail located at axially opposite ends of the primary containment sheet. A secondary containment sheet is fixedly joined to a radially inward surface of the primary containment sheet. The secondary containment sheet can be a single layer or of multiple layers fixedly joined to each other. The system includes a first and second mounting hook, at least one of which can be integral with either the primary containment sheet or the secondary containment sheet. The primary containment sheet and the rails can have substantially the same thickness. The laminated containment system can further include a secondary containment sheet brazed to a radially outward surface of the primary containment sheet. The laminated containment system further includes a rub strip disposed between the secondary containment sheet and a turbine blade.

In an alternative embodiment, a low pressure turbine assembly with improved blade containment capabilities is disclosed having a first and a second turbine shroud segment each having a radially inward and a radially outward surface, the first turbine shroud segment is adjacent the second segment. Each of the shroud segments further includes a primary containment sheet fixedly joined to the radially outward surface of the segment and a first and a second rail located at axially opposite ends of the primary containment sheet. Each of the segments further includes a secondary containment sheet fixedly joined to a radially inward surface of the primary containment sheet. The turbine assembly also includes a containment bridge affixed to the primary containment sheet of the first shroud segment that extends over the primary containment sheet of the second shroud segment. A turbine case extends around the shrouds and the bridge, and the bride is disposed between the shrouds and the case.

The primary containment sheet of the assembly and the mounting rails can be of uniformly increased thickness as compared with a conventional backsheet rail and containment shield design, the increased thickness is in excess of about 0.015-0.025 inches. In this embodiment, modified mounting hooks for mounting the improved backsheet to the case are used. The mounting hook are of reduced thickness as compared with a conventional mounting hook for the conventional backsheet proportional to the increase in thickness of the primary backsheet.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein:

FIG. 3 is a sectional view of an assembled LPT shroud assembly mounted to the LPT case.

FIG. 4 is a side view of the turbine assembly with enhanced containment capabilities having a containment bride extending across adjacent shroud segments;

FIG. 4A is a sectional view of the turbine assembly with enhanced containment capabilities having a containment bride extending across adjacent shroud segments;

DETAILED DESCRIPTION OF THE INVENTION

Figure 1:
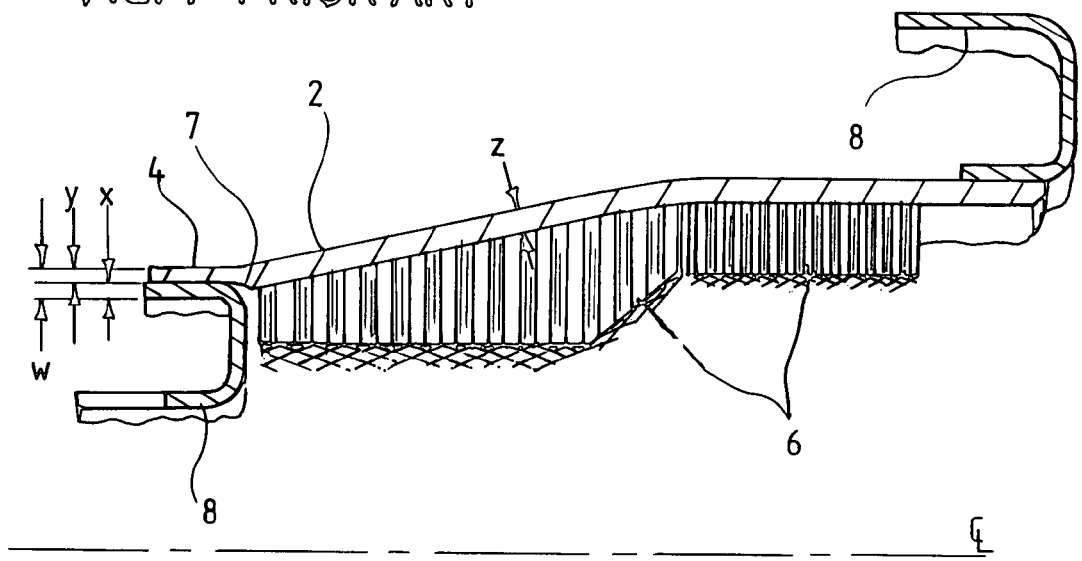
FIG. 1 is a sectional view of a prior art turbine shroud.

FIG. 1 is an example of a design referred to in the '242 and '026 patents. Referring now to FIG. 1 it can be seen that the blade containment shield portion 2 of the backsheet is of thickness 'z', while the rail portion 4 is of conventional thickness 'y', which is less than 'z'. The mounting hook 8 is of conventional thickness 'x'. The combined thickness of the rail 4 and the mounting hook 8 is 'w'. Rub strip 6 also is shown. Interface 7 between the thicker middle section 2 and thinner rails 4 is a potential weak link in the backsheet, where failure is likely to occur in the event of a turbine blade ejection event.

Figure 2:
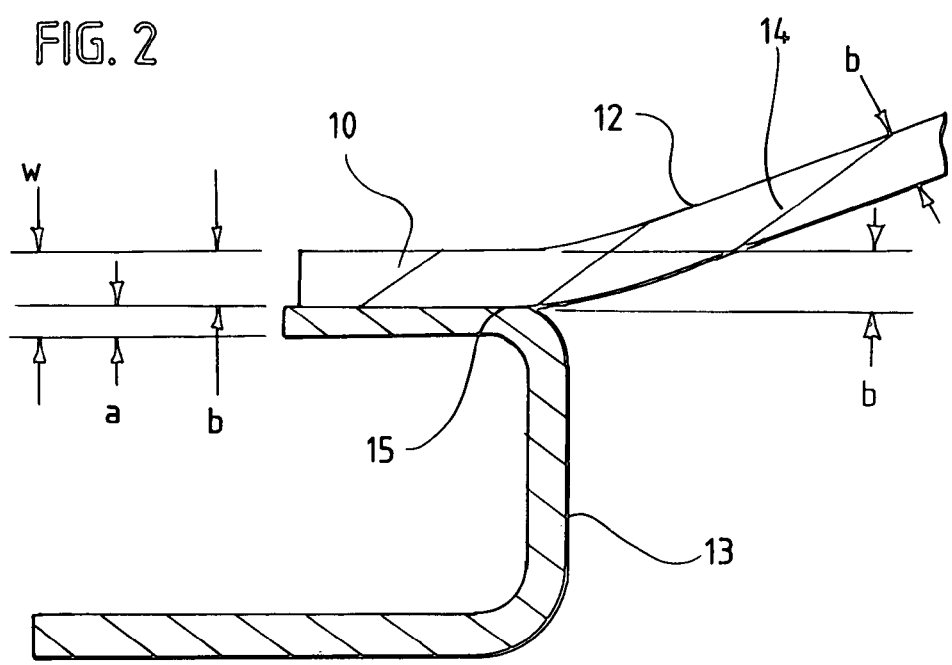
FIG. 2 is an enlarged, partial sectional view of one embodiment of the inventive turbine shroud having a backsheet and rail of enhanced thickness and mounting hook of proportionally reduced thickness.

In one embodiment the present invention eliminates the weak link interface between the thickened blade containment shield and the thinner rails. Referring now to FIG. 2, it can be seen that this inventive backsheet design is a single piece backsheet 12 of uniform thickness 'b', such that the mounting rails 10 and the blade containment shield 14 have the same thickness 'b'. Mounting hook 13 is fixedly engaged (for example by brazing) with rail 10 forming interface 15. While FIG. 2 shows only one backsheet rail and mounting hook, it should be understood that the backsheet 12 generally has a second rail that is brazed or otherwise fixedly engaged to a second mounting hook at the opposite end, which is not shown. The inventive backsheet is thicker and stronger than conventional backsheets of uniform thickness (generally in the range of about 0.015-0.025 inches), and can be retrofitted into existing LPT shrouds by reducing the thickness 'a' of the mounting hooks 13 proportionally to the increase in thickness of the backsheet, such that the total thickness of the backsheet rail and mounting hooks remains a constant thickness 'w'.

The backsheet must be thick enough to dissipate energy from a blade during an ejection event. In a preferred embodiment the backsheet thickness is between about 0.050 and 0.075 inches, and is the same thickness along the length of the backsheet. The mounting hooks have a preferred thickness between about 0.013 and 0.025 inches. This uniform, enhanced backsheet thickness of the present invention allows the backsheet to dissipate the impact energy from a released blade, while also reducing the potential for crack growth and shearing in the both the rails and the middle section of the backsheet at the mounting hook-rail interface 15.

FIG. 3 shows a schematic of a typical LPT assembly mounted to the LPT case 19. Referring now to FIG. 3, it is seen that turbine shroud backsheet 23 is brazed to mounting hook 21, which engages corresponding mounting hardware 17 located on the case 19. The shroud segment assembly also includes a cross anti-rotation pin 16, shroud forward stop 20, overlap seal 22, and shroud radial and axial lengtheners 26 to reduce gaps. Nozzle spline seals 24 also are shown. The area between the outer surface of the shroud and the inner surface of the case is referred to herein as the assembly envelope 28. In general most LPT shrouds are assembled and supported in the same or similar manner. As seen in the assembly in FIG. 3 the shrouds are installed by first inserting the forward rail 30 into the casing slot 18, thus entrapping the shroud. The next stage of blades 32 is then installed and finally the rear section of the shroud 31 is supported by installing the next stage vane segment 34 and attaching it to the case 19. This process is repeated until all the stages of the LPT have been assembled.

The present invention also includes a method of improving the containment capability of LPT shrouds such as those disclosed in the '242 and '026 patents by retrofitting a currently available segmented shroud with a backsheet of constant, enhanced thickness from end to end. This improved backsheet design is thicker than the conventional designs, but avoids the drawbacks of the designs disclosed in the '242 and '026 patents, which have backsheet rails that are thinner than the middle section. To fit the backsheet into an existing assembly envelope, new mounting hooks of proportionally reduced thickness are brazed onto the backsheet so that the total combined thickness of the mounting hooks and backsheet rail remains unchanged. Alternatively, the existing mounting hooks can be removed from the existing backsheet, which is discarded. The hooks are then reduced in thickness proportionally to the increase in new backsheet rail thickness and brazed onto the new backsheet rail.

In an alternative embodiment the invention includes an apparatus and method for improved containment of LPT shrouds by utilizing the currently available segmented shroud in conjunction with the engine case. In developing a blade containment system from segmented low-pressure turbine (LPT) segments one area that must be addressed is the deflection and displacement of the shrouds relative to each other. Currently during a blade release event the blade impinges on the shroud at such a force and tangential direction that the shrouds deflects outward under the ejection force of the blade. Since the LPT shrouds are segmented and not a continuous ring, a forward facing step is created between the two adjacent shroud segments. The blade sliding along the deflected shroud will then come into contact with the exposed forward facing edge of the adjoining shroud thus causing it to be forced from its current position in the case. During this event the adjoining shroud is forced to move outward due to the sliding blade and can eventually pierce the case depending on the angle, force, and stiffness of the shroud. Referring now to FIGS. 4 and 4A, it is seen that a containment bridge 40 is defined across the two shrouds 42 and 44 where they abut to each other 46. This bridge 40 that extends across both of the adjoining shrouds 42 and 44 extends outward radial to a position very close to the turbine case 48. The bridge 40 is attached to the down stream shroud 42, relative to the rotor rotation, such that the shrouds can be assembled and that the radial location of the shroud edges remains in proximity of each other during the blade release incident. If the blade comes in contact with the upstream shroud 44 and forces it out radially, the shroud would then come in contact with the bridge and the bridge would in turn make contact with the case 48. In such a blade failure event, the bridge 40, which is permanently attached to the downstream shroud 42, would be pulled along as it moves outward towards the case thus minimizing the potential step between the two adjoining shrouds. Since there is no step created between the two adjoining shrouds, the blade would continue to move in a circumferential path around the engine and not force any shroud from its current position in the case. The bridge 40 works with the case to create a stiff "hoop like" effect with the shrouds. The bridge 40 must be rigid enough to not buckle under the loading and also to add some local rigidity to the shroud. In addition, if this bridge 40 is extended the entire length of the shroud, the casing and the shroud act together in absorbing energy. The bridge 40 should be sized to prevent buckling. In a preferred embodiment, the bridge will be weight reduced by some method such as for example by including weight reduction holes 50.

In an alternative embodiment, the invention comprises a laminated containment system having a primary containment sheet, which is used to bridge the distance between the two rails of conventional design. The sheet can be of uniform thickness or of varying thickness depending on the attachment schemes being used. In addition to the primary containment sheet there is also a secondary containment sheet that can be sized as required to fulfill the needed containment requirements. The secondary containment sheet is fixedly attached, for example by brazing, to the primary containment sheet and they act together to dissipate the blade impact energy. This laminate containment construction also is believed to inhibit crack growth through the primary sheet, with a crack initiating in the secondary sheet generally being stopped or directed along the interface when it intersects with the braze joint. This laminated system can be made in several configurations, preferably having from two to four pieces.

Figure 5:
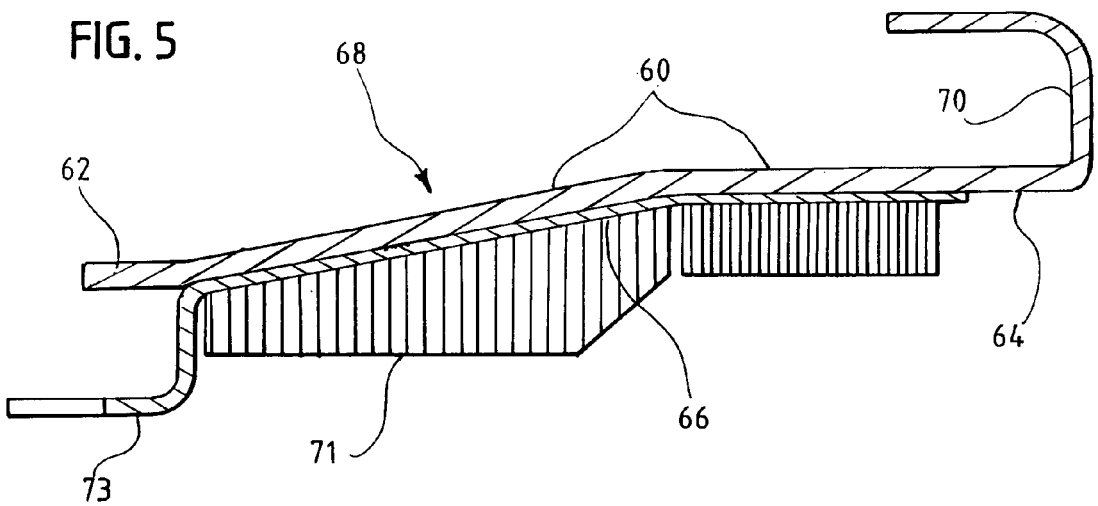
FIG. 5 is a sectional view of a 2-piece laminated containment system

Referring now to FIG. 5, it is seen that in one embodiment the laminated containment system comprises a two piece design including a backsheet 68 having a primary containment sheet 60, and forward 62 and aft 64 rails all having substantially the same thickness. A secondary containment sheet 66 is brazed to and extends from the primary containment sheet and is disposed between the primary containment sheet and a rub strip 71. A first hook 70 is integral with the primary containment sheet 60. A second hook 73 is integral with the secondary containment sheet 66.

Figure 6:
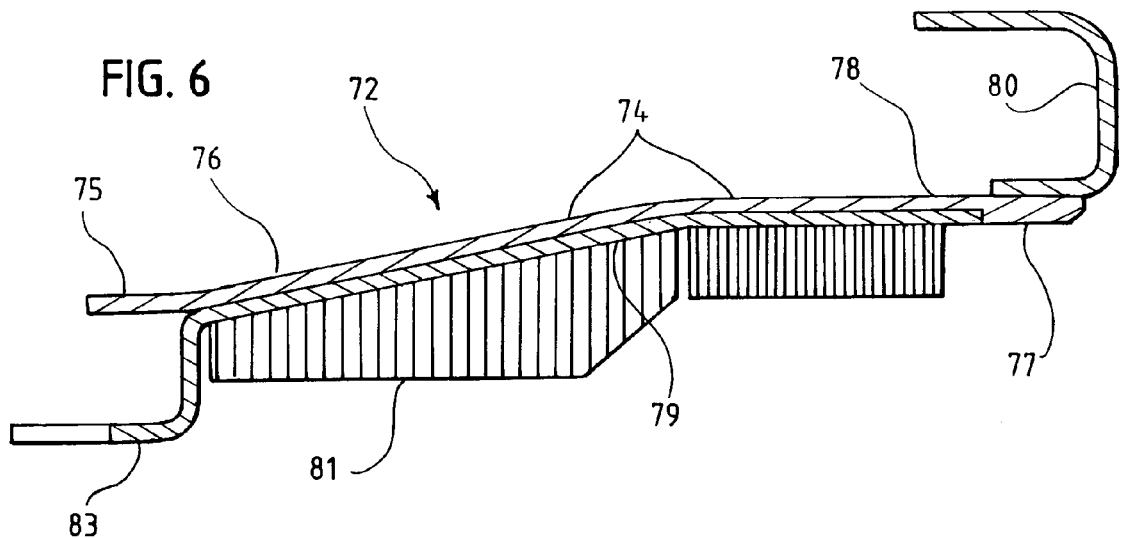
FIG. 6 is a sectional view of a 3-piece laminated containment system

Referring now to FIG. 6, it is seen that in an alternative embodiment the invention comprises a three piece design including a backsheet 72 having a primary containment sheet 74 with a forward 76 and an aft 78 end, and forward 75 and aft 77 rails, all having substantially the same thickness. The aft hook 80 is a separate piece from the primary containment sheet 74 and aft rail 77, which are preferably of a unitary construction. The forward rail 75 has an integral mounting hook 83 as part of the secondary containment sheet 79. The secondary containment sheet 79 is brazed to and extends from the primary containment sheet and is disposed between the primary containment sheet and a rub strip 81.

Figure 7:
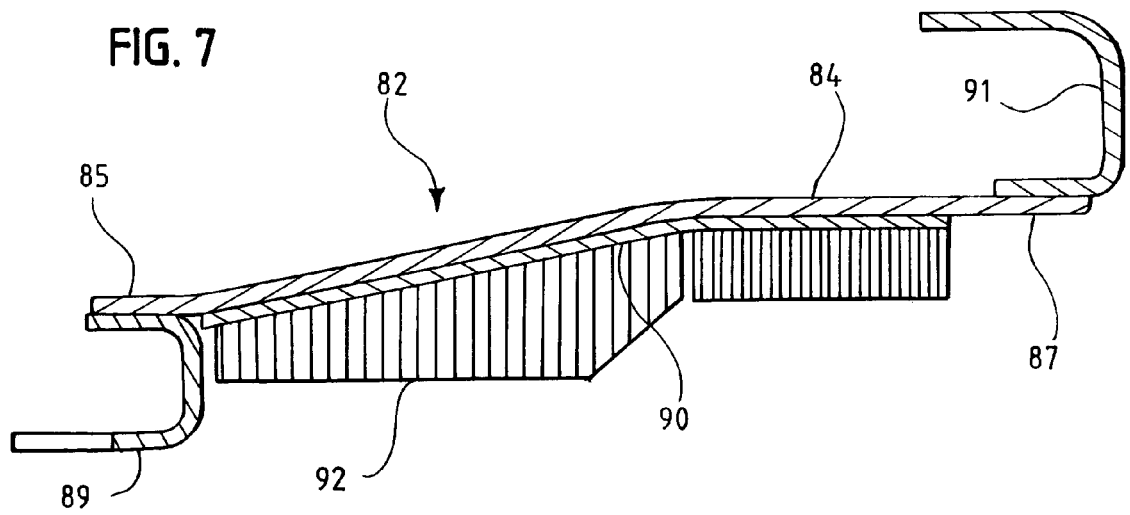
FIG. 7 is a sectional view of a 4-piece laminated containment system

Referring now to FIG. 7, it is seen that an alternative embodiment the invention comprises a four piece design including a backsheet 82 having a primary containment sheet 84, and forward 85 and aft 87 rails, the primary containment sheet 84 having substantially same thickness as the forward 85 and aft 87 rails. Forward rail 85 has mounting hook 89 brazed onto it. Aft rail 87 has second mounting hook 91 brazed onto it. A secondary containment sheet 90 is brazed to and extends from the primary containment sheet 84 and is disposed between the primary containment sheet 84 and rub strip 92.

Although the two-piece, three-piece and four-piece embodiments described above have primary containment sheet and rails of substantially the same thickness, these embodiments of the invention also contemplate rails and primary backsheets of different thicknesses as necessary to fit within a given low pressure turbine assembly.

In an alternative embodiment multiple layers of secondary containment sheets are brazed together and brazed onto the radially inner surface of the primary containment sheet. Alternatively, one or more secondary containment sheets can be brazed onto the inner surface of the primary containment sheet with one or more additional containment sheets brazed onto the radially outer surface of the primary containment sheet.

In an alternative embodiment, the laminated design also can include a containment bridge across successive turbine shroud segments as described hereinabove. To further improve blade containment, this embodiment also can include a turbine shroud backsheet of uniformly enhanced thickness and mounting hooks of proportionately reduced thickness as described hereinabove.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A low pressure turbine assembly comprising:
 a turbine shroud backsheet with enhanced blade containment capabilities that is sized to be retrofitted into a conventional low pressure turbine assembly, the backsheet having first and second mounting rails at axially opposite ends thereof and a blade containment shield disposed therebetween, the rails and containment shield having a uniform cross-sectional thickness in excess of about 0.015-0.025 inches sufficient to dissipate energy upon ejection of a turbine blade thereagainst;

a modified mounting hook for mounting the backsheet to a turbine case extending around the shroud, the hook corresponding to and engaging the backsheet at one of the rails, the hook being of proportionally reduced cross-sectional thickness with respect to the increase in thickness of the backsheet to enable the backsheet to be retrofitted into a conventional low pressure turbine assembly.

2. The low pressure turbine assembly of claim 1 further comprising a rub strip disposed between a radially inner surface of the backsheet and a turbine blade.

3. The low pressure turbine assembly of claim 1 further comprising a second mounting hook corresponding to and engaging the second of the rails, the second mounting hook being of reduced cross-sectional thickness as compared with a conventional mounting hook for mounting a conventional backsheet to a turbine case, the reduced cross-sectional thickness being proportional to the increase in thickness of the backsheet.

4. The low pressure turbine assembly of claim 1 wherein the backsheet thickness is between about 0.050 and 0.075 inches.

5. The low pressure turbine assembly of claim 1 wherein the mounting hook thickness is between about 0.013 and 0.025 inches.

6. A low pressure turbine assembly with improved blade containment capabilities comprising:
   a first and a second turbine shroud segments each having a radially inward and a radially outward surface, the first turbine shroud segment adjacent the second segment;
   a containment bridge affixed to the radially outward surface of the first shroud segment and extending over the radially outward surface of the second shroud segment;
   a turbine case extending around the shrouds and the bridge, with the bridge disposed between the shrouds and the case.

7. The turbine assembly of claim 6 wherein the bridge includes one or more weight reducer holes.

8. A laminated containment system for low pressure turbine shrouds comprising:
   an arcuate turbine shroud having a primary containment sheet with a radially inward and a radially outward surface, and a first and a second rail located at axially opposite ends of the primary containment sheet;
   a secondary containment sheet fixedly joined to the radially inward surface of the primary containment sheet;
   wherein both the primary containment sheet and the secondary containment sheet are substantially non-porous and capable of dissipating energy of a turbine blade during an ejection event.

9. The laminated containment system of claim 8 wherein the secondary containment sheet comprises multiple layers fixedly joined to each other.

10. The laminated containment system of claim 8 further comprising first and second mounting hooks for mounting the shroud to a turbine case extending around the shroud.

11. The laminated containment system of claim 10 wherein at least one of said mounting hooks is integral with either the primary containment sheet or the secondary containment sheet.

12. The laminated containment system of claim 8 wherein the primary containment sheet and the rails have substantially the same thickness.

13. The laminated containment system of claim 8 further comprising an additional secondary containment sheet fixedly joined to a radially outward surface of the primary containment sheet.

14. The laminated containment system of claim 8 wherein the secondary containment sheet is brazed to the primary containment sheet.

15. The laminated containment system of claim 8 further comprising a rub strip disposed between the secondary containment sheet and a turbine blade.

16. A low pressure turbine assembly with improved blade containment capabilities comprising:
   a first and a second turbine shroud segment each having a radially inward and a radially outward surface, the first turbine shroud segment adjacent the second segment;
   each of the shroud segments further including a primary containment sheet fixedly joined to the radially outward surface of the segment and a first and a second rail located at axially opposite ends of the primary containment sheet;
   each of the segments further including a secondary containment sheet fixedly joined to a radially inward surface of the primary containment sheet;
   a containment bridge affixed to the primary containment sheet of the first shroud segment and extending over the primary containment sheet of the second shroud segment; and
   a turbine case extending around the shrouds and the bridge, with the bridge disposed between the shrouds and the case.

17. The turbine assembly of claim 16, wherein
   the primary containment sheet and the mounting rails are of uniformly increased thickness as compared with a conventional backsheet rail and containment shield design, the increased thickness being in excess of about 0.015-0.025 inches; and
   wherein the assembly further includes a modified mounting hook for mounting the improved backsheet to the case, the mounting hook being of reduced thickness as compared with a conventional mounting hook for the conventional backsheet proportional to the increase in thickness of the primary backsheet.

18. The turbine assembly of claim 16 further comprising a comprising a rub strip disposed between the secondary containment sheet and a turbine blade.

19. The turbine assembly of claim 16 wherein the secondary containment sheet comprises multiple layers fixedly joined to each other.

20. The turbine assembly of claim 17 wherein the backsheet thickness is between about 0.050 and 0.075 inches and the mounting hook thickness is between about 0.013 and 0.025 inches.

* * * * *